Figure 3:
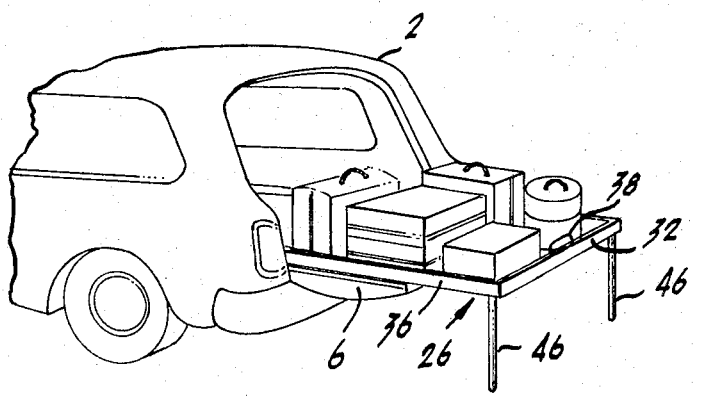

United States Patent [19]
Zelin

[11] 3,726,422
[45] Apr. 10, 1973

[54] SLIDING LUGGAGE RACK FOR STATION WAGONS

[76] Inventor: Albert Rush Zelin, Glenbrook, Storybrook Road, Hopewell, N.J. 08525

[22] Filed: Mar. 18, 1971

[21] Appl. No.: 125,553

[52] U.S. Cl. ............... 214/83.24, 296/26, 296/37
[51] Int. Cl. ............................................. B60p 3/00
[58] Field of Search ................. 214/83.24, 450; 296/26, 37; 105/450

[56] References Cited

UNITED STATES PATENTS

| | | | |
|---|---|---|---|
| 3,028,025 | 4/1962 | White | 214/83.24 X |
| 1,506,462 | 8/1924 | Thompson | 105/369 B |
| 1,891,588 | 12/1932 | Claus | 105/369 B |
| 2,795,363 | 6/1957 | Turner | 296/26 X |
| 3,006,487 | 10/1961 | Gelli | 214/83.24 |
| 084,816 | 4/1963 | Bozio | 214/83.24 |
| 3,132,755 | 5/1964 | Greenslate | 214/83.24 |
| 3,381,835 | 5/1968 | Lee | 214/83.24 X |

*Primary Examiner*—Albert J. MaKay
*Attorney*—Sperry and Zoda

[57] ABSTRACT

A luggage rack for use in a station wagon is adapted to be inserted into the rear of a station wagon body and removably mounted above the floor or any folded seats in the body when luggage, trunks, boxes or other cargo are to be transported. At such times the luggage rack is secured in place and a portion of the rack is arranged to be extended outward through the rear door into a position for convenient arrangement and stowage of the cargo to be carried. The extended portion of the rack with articles located thereon is then slidably movable into the body of the station wagon for enclosure within the body during travel. When not in use the luggage rack is readily removable from the body to permit the car seats to be raised for use by passengers.

2 Claims, 6 Drawing Figures

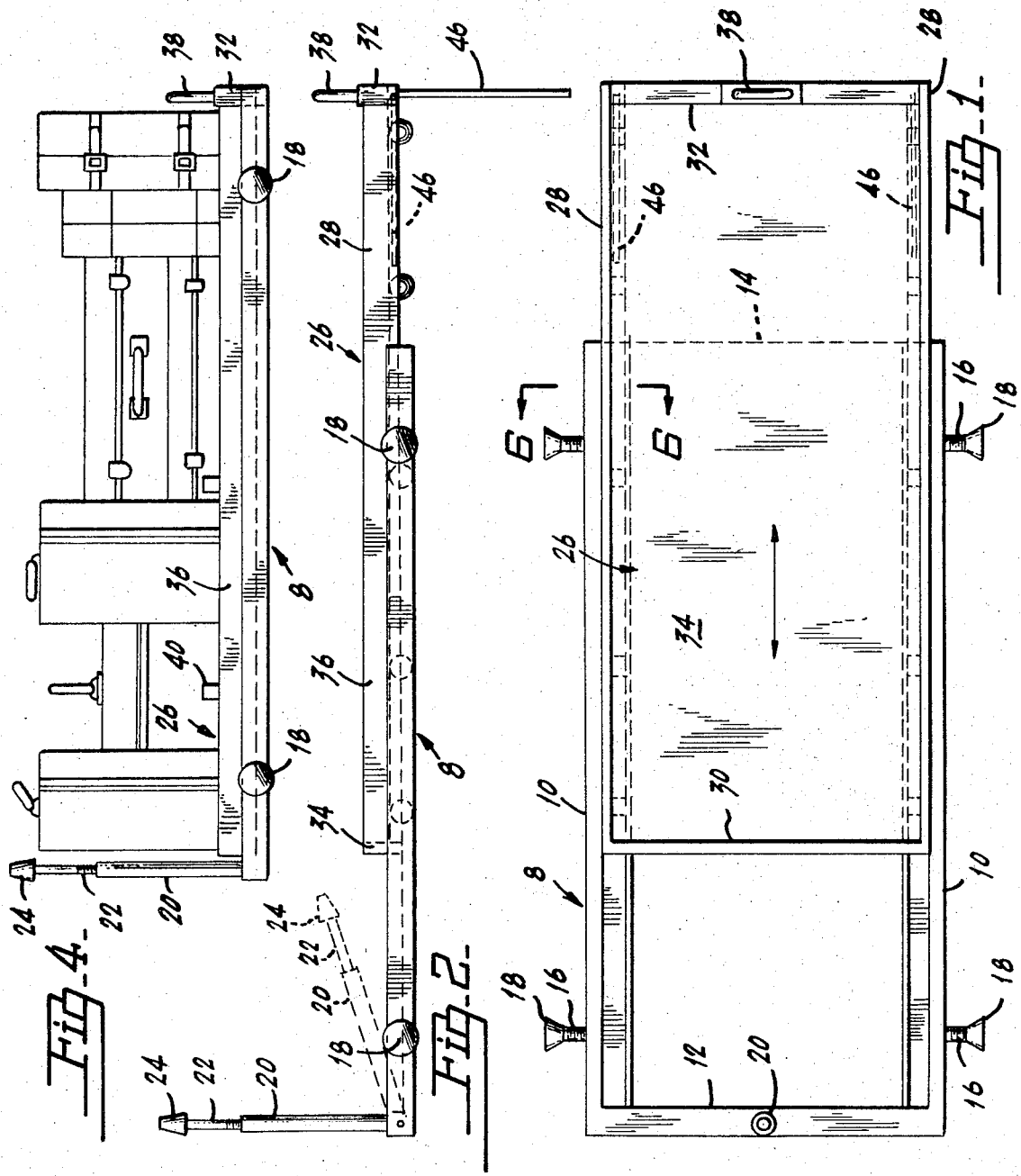

SLIDING LUGGAGE RACK FOR STATION WAGONS

FIELD OF INVENTION

Most station wagons are provided with room in the rear for one or more seats to permit the carrying of several passengers. Nevertheless the seats are generally arranged to be folded down toward the floor of the body to provide space for receiving luggage, boxes or cargo of various types. However, when numerous pieces of luggage, large boxes, trunks, or bulky cargo are to be stowed in the rear of a station wagon it is generally necessary for someone to get into the body to arrange the various pieces of luggage in a safe and orderly manner for travel. At such times the limited head room available above the floor or folded seats renders it necessary for a person to work in a stooped or cramped position and making it very difficult to lift or shift and move the articles about and into the best arrangement for travel. Moreover, when one or two pieces of luggage are to be removed from a number of orderly stowed pieces it is often necessary for someone to crawl over other pieces or articles to get the needed pieces out through the rear of the body.

THE PRESENT INVENTION

In accordance with the present invention a removable luggage rack is provided which can be easily positioned within the body of a station wagon directly above the floor or folded seats and means are provided for releasably but securely mounting the rack in place. The rack includes a support upon which a carriage for receiving the luggage is slidably movable through the rear door of the station wagon to an extended position for permitting the place and arrangement of luggage on the carriage by persons standing on the ground at the rear of the vehicle. The carriage with the luggage properly stowed and arranged thereon can then be moved back along the support to a retracted position within the station wagon. Thereafter if any particular article is required for use the luggage support may again be pulled out and the desired article be removed without disturbing the arrangement of the other articles on the support.

THE DRAWINGS

Figure 5:
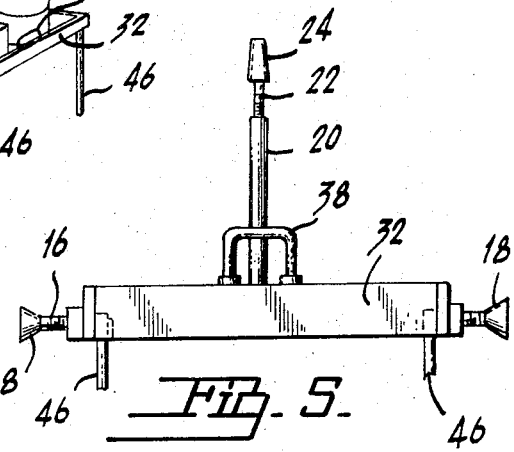
Figure 6:
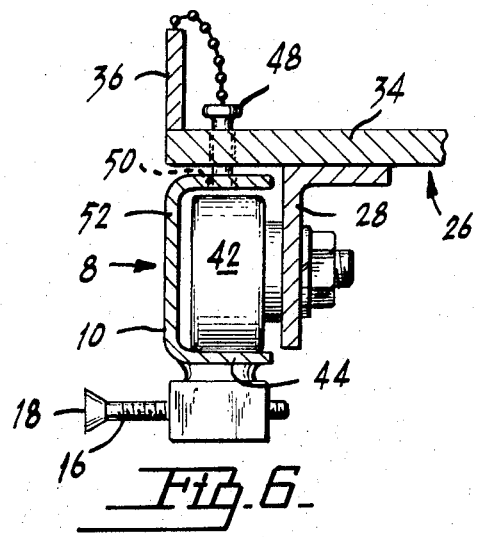

FIG. 1 is a top plan view of a typical form of luggage rack embodying the present invention, FIG. 2 is a side elevation of the luggage reack illustrated in FIG. 1 with its carriage extended, FIG. 3 is a perspective illustrating the arranging of luggage on the extended carriage of FIG. 2, FIG. 4 is a side elevation of the rack of FIGS. 1, 2 and 3 with luggage arranged on the carriage and located in a retracted position, FIG. 5 is an end elevation of that form of rack illustrated in FIGS. 1 to 4; and FIG. 6 is a transverse sectional view taken on the line 6—6 of FIG. 1.

PREFERRED EMBODIMENT OF THE INVENTION

In that form of the invention chosen for purposes of illustration in the drawings the luggage rack assembly is designed to be removably mounted within a vehicle 2 such as a station wagon having a rear end 4 provided with a rear door 6. The assembly includes a generally rectangular frame or support 8 having opposite side rails 10 held in parallel spaced relation by an inner end member 12 and an outer end member 14. Holding means 16 are connected to the opposite side rails 10 for engaging the inner surfaces or members located on the opposite side walls of the vehicle body. The holding members shown are in the form of bolts or studs threadedly engaging the rails 10 and provided with rubber, plastic or other cushioning means 18 at the outer ends thereof. The holding means are thus adapted to be threaded inward on the side rails to allow the support to be readily inserted into the desired position within the vehicle body, after which the members may be threaded outward to engage the opposite sides walls of the vehicle or members located adjacent the side walls, to fixedly secure the support in place above the floor or folded seats within the vehicle body. When so located the inner end member 12 is positioned near the front end of the vehicle body whereas the outer end member 14 is located within the vehicle body and near the rear door 6 of the body.

The frame or support 8 preferably also is provided with hold-down means located near the inner end of the support and as shown in FIGS. 1, 2 and 3, such hold down means may be in the form of a rod 20 connected to the inner end member 12 of the support. A bolt or stud 22 threadedly connected to the upper end of the rod 20 has cushioning means 24 thereon, so that the stud can be projected and retracted to move the cushioning means 24 into retaining engagement with the roof or a roof support to prevent upward movement of the inner end of the support 8 away from the floor or seats over which it is positioned. If desired the rod 20 may be pivotally mounted on the support 8 so that it can be folded downward toward the dotted line position shown in FIG. 2 when the assembly is being inserted or removed or when it is to be stored in a garage or elsewhere.

A luggage supporting carriage 26 is slidably mounted on the support 8 of the assembly so as to be movable along the side rails 10 of the support into a retracted position wherein it is located wholly within the vehicle body and in front of the rear door 6, and to an extended position wherein the carriage projects through the rear end of the vehicle for convenient placement and arrangement of luggage or other articles thereon as shown in FIGS. 1, 2 and 3.

The carriage 26 preferably is generally rectangular in shape and only slightly shorter than the support 8. For this purpose the carriage has opposite side members 28, an inner end member 30 and an outer end member 32. Luggage receiving means 34 in the general form of a tray with side plates 36 is mounted on the carriage to support and hold the luggage or other articles. The outer end member of the carriage may have a handle 38 connected thereto to enable the carriage to be easily pushed into its retracted position with luggage thereon and to be pulled outward through the rear end of the vehicle for easy loading of the carriage. Further, if desired the luggage receiving tray 34 may be provided with article positioning members 40 arranged in position to hold specific articles such as items of camping equipment including a stove, refrigerator or the like in fixed position on the carriage.

The support 8 and carriage 26 are preferably provided with cooperating antifriction means such as rollers 42 which serve to facilitate the movement of the carriage 26 on the rails 10 of the frame 8 into and out of extended and retracted positions. For this purpose the parallel rails 10 of the frame or support 8 may be in the form of inwardly facing channel members as shown in FIG. 6 and the side members 28 of the carriage 26 may have the rollers 42 mounted thereon in position to roll along the lower side 44 of the channel members 10 as the carriage is moved into and out of the vehicle body. The carriage 26 further may have legs or supports 46 pivotally mounted on the outer end member 32 of the carriage, for movement into the supporting position shown in FIG. 3 to aid in supporting and stabilizing the carriage when it is in its extended position and when loading or arranging luggage or other articles thereon. In order to hold the carriage 26 in place when in its retracted position and prevent it from rolling freely back and forth along the rails 10 as the vehicle is started and stopped, positioning means may be provided. Thus, as shown in FIG. 6, a positioning pin 48 carried by the carriage 26 and movable into a hole 50 in the upper member 52 of one of the rails 10 of the support 8.

The construction thus provided is compact in form so that it may be easily folded for storage when not in use, allowing the station wagon or other vehicle to be used in a normal manner whn it is not required for carrying luggage or other articles. However, when luggage or the like are to be transported, the luggage rack of the present invention may be inserted through the rear door and positioned adjacent the floor or over folded seats. The holding members 16 on the opposite side rails 10 may then be threaded outward or otherwise extended to firmly engage the side walls of the vehicle so as to secure the assembly in place. The hold-down means or rod 20 may then be swung upward and the stud 22 projected to engage the roof or an upper framing member of the vehicle.

Thereafter when luggage is to be stowed in the vehicle, the pin 48 is withdrawn from the opening 50 in the side rail 10 of the support 8 so that the carriage 26 and its tray 34 can be rolled out through the rear door of the vehicle to the etended position shown in FIGS. 2 and 3. The legs or supports 46, if used, can then be swung downward to engage the ground and provide further support for the carriage. The carriage may of course be allowed to remain extended for use as a luncheon table or support for a stove, bed or the like when camping. However, when used as a luggage carrier and when the luggage or other articles have been placed on the carriage tray, the legs 46 may be folded back, and the loaded carriage can be rolled back into the vehicle body. The pin 48 is then inserted into the opening 50 in rail 10 and the rear door of the vehicle may be closed in readiness for travel.

The equipment thus provided is inexpensive to produce and very convenient to use whereas it is readily removed from the vehicle when not required. While one particular and preferred embodiment of the invention has been shown in the drawings and described above, it will be apparent that the assembly is capable of many changes in the form, construction and arrangement without departing from the spirit and scope of the invention as defined by the following claims.

I claim:

1. A self-contained luggage rack assembly adapted to be removably mounted within and removed from the body of a station wagon or other vehicle having side walls and a rear door, said rack comprising an elongated support, holding means carried by said support and movable outwardly from the sides of said support into retaining engagement with the sides of the vehicle body adjacent to the support for releasably securing said support in a fixed position within the body of the vehicle with one end of said support located adjacent the rear door of the body, said holding means being retractable to permit ready removability of the luggage rack from the vehicle when not in use, said support also having an opposite end spaced from the rear door of the vehicle body and hold-down means are located near said opposite end of the support and movable upwardly therefrom into engagement with a member adjacent the roof of the vehicle body to prevent said opposite end of the support from moving upwardly when the said carriage is moved to said extended position, a carriage movable lengthwise of said support to an extended position wherein a portion of the carriage projects beyond said support and through the rear door of the vehicle body and to a retracted position wherein said carriage is located wholly within the vehicle body and in front of said rear door, and means on said carriage for supporting luggage or the like.

2. A luggage rack as defined in claim 1 wherein said support is generally rectangular in shape, and said holding means are threadedly connected to opposite sides of said support for movement into retaining engagement with the opposite sides of the vehicle.

* * * * *